(12) United States Patent
Mulkey et al.

(10) Patent No.: US 10,693,756 B2
(45) Date of Patent: Jun. 23, 2020

(54) DYNAMIC QUALITY OF SERVICE OVER COMMUNICATION CIRCUITS

(71) Applicant: BIGLEAF NETWORKS, INC., Beaverton, OR (US)

(72) Inventors: Joel Mulkey, Hillsboro, OR (US); Luke Heberling, Dublin (IE)

(73) Assignee: BIGLEAF NETWORKS, INC., Beaverston, OR (US)

( * ) Notice: Subject to any disclaimer, the term of this patent is extended or adjusted under 35 U.S.C. 154(b) by 0 days.

(21) Appl. No.: 16/202,026

(22) Filed: Nov. 27, 2018

(65) Prior Publication Data
US 2019/0116106 A1 Apr. 18, 2019

Related U.S. Application Data

(63) Continuation of application No. 14/941,487, filed on Nov. 13, 2015, now Pat. No. 10,178,008.
(Continued)

(51) Int. Cl.
*H04L 12/46* (2006.01)
*H04L 12/26* (2006.01)
(Continued)

(52) U.S. Cl.
CPC ...... *H04L 43/0823* (2013.01); *H04L 12/4633* (2013.01); *H04L 43/04* (2013.01);
(Continued)

(58) Field of Classification Search
CPC ......... H04L 12/00; H04L 12/12; H04L 12/28; H04L 12/2854–2859; H04L 12/2863; H04L 12/46; H04L 12/4633; H04L 12/4641; H04L 41/00; H04L 41/08–0823; H04L 41/0896; H04L 41/14; H04L 41/142; H04L 45/00; H04L 45/22; H04L 45/24; H04L 47/00; H04L 47/10–127; H04L 47/24; H04L 47/2441; H04L 47/2483;
(Continued)

(56) References Cited

U.S. PATENT DOCUMENTS 5,922,051 A * 7/1999 Sidey .................. H04L 41/0213
709/223
6,208,619 B1 * 3/2001 Takeuchi ................ H04L 47/10
370/229
(Continued)

OTHER PUBLICATIONS

Rate—Definition of Rate by Merriam-Webster (Year: 2014).*

*Primary Examiner* — Tauqir Hussain
*Assistant Examiner* — Boris D Grijalva Lobos
(74) *Attorney, Agent, or Firm* — FisherBroyles, LLP; Micah D. Stolowitz

(57) ABSTRACT

Monitoring packets can be sent periodically across IP network tunnels that traverse internet connections to a customer location, and the monitoring packets used to determine current packet-loss, latency, and jitter metrics in each direction for each available circuit. If monitored metrics change beyond set thresholds, a determination is made as to whether the changes are due to circuit saturation or some other cause. If saturation is the problem, logic at either or both tunnel endpoints dynamically adjusts QOS rate limits to optimum values (the highest rate that does not cause threshold violations) in near-real time.

18 Claims, 6 Drawing Sheets

Related U.S. Application Data

(60) Provisional application No. 62/079,792, filed on Nov. 14, 2014.

(51) Int. Cl.
*H04L 12/803* (2013.01)
*H04L 12/721* (2013.01)
*H04L 12/707* (2013.01)
*H04L 12/851* (2013.01)

(52) U.S. Cl.
CPC ........ *H04L 43/087* (2013.01); *H04L 43/0829* (2013.01); *H04L 43/0852* (2013.01); *H04L 43/10* (2013.01); *H04L 43/106* (2013.01); *H04L 43/16* (2013.01); *H04L 45/124* (2013.01); *H04L 45/24* (2013.01); *H04L 45/70* (2013.01); *H04L 47/125* (2013.01); *H04L 47/2425* (2013.01)

(58) Field of Classification Search
CPC ................ H04L 43/00; H04L 43/04; H04L 43/08–0864; H04L 43/0876–50; G06F 11/00; G06F 11/008; G06F 11/30; G06F 15/00; G06F 15/16
See application file for complete search history.

(56) References Cited

U.S. PATENT DOCUMENTS

| | | | |
|---|---|---|---|
| 6,449,272 B1* | 9/2002 | Chuah | H04L 12/4633 370/389 |
| 6,452,915 B1* | 9/2002 | Jorgensen | H04L 1/20 370/338 |
| 6,668,282 B1* | 12/2003 | Booth, III | H04L 41/0681 709/223 |
| 7,447,153 B2* | 11/2008 | Klinker | H04L 12/4633 370/231 |
| 7,590,152 B1* | 9/2009 | Filsfils | H04L 43/087 370/235 |
| 7,620,037 B1* | 11/2009 | Bhaskaran | H04L 43/0817 370/356 |
| 7,673,048 B1* | 3/2010 | O'Toole, Jr. | H04L 12/4633 370/229 |
| 7,710,902 B2* | 5/2010 | Vasseur | H04L 12/4633 370/228 |
| 7,734,789 B2* | 6/2010 | Calhoun | H04L 12/2856 709/225 |
| 7,808,918 B2* | 10/2010 | Bugenhagen | H04L 47/22 370/229 |
| 7,809,860 B2* | 10/2010 | McDysan | G06Q 20/102 709/249 |
| 7,898,970 B2* | 3/2011 | Klinker | H04L 12/4633 370/248 |
| 7,903,557 B1* | 3/2011 | Colloff | H04L 47/125 370/231 |
| 7,961,625 B2* | 6/2011 | Raciborski | H04L 45/00 370/237 |
| 8,125,911 B2* | 2/2012 | Patel | H04L 12/5691 370/241 |
| 8,145,788 B1* | 3/2012 | Love | H04L 61/1511 709/217 |
| 8,316,226 B1* | 11/2012 | Kshirsagar | H04L 63/0272 713/150 |
| 8,406,134 B2* | 3/2013 | Medina | H04L 1/0009 370/231 |
| 8,645,568 B2* | 2/2014 | Patterson | H04L 45/02 709/240 |
| 8,675,485 B2* | 3/2014 | Bhaskaran | H04L 43/0811 370/231 |
| 8,706,865 B1* | 4/2014 | L'Heureux | H04L 67/101 709/221 |
| 8,880,690 B1* | 11/2014 | Kennedy | H04L 41/0813 709/224 |
| 9,300,570 B2* | 3/2016 | Hengeveld | H04L 12/4633 |
| 9,608,875 B2* | 3/2017 | Shaw | H04L 41/5025 |
| 9,755,926 B2* | 9/2017 | Pasuparthy | H04L 43/08 |
| 9,787,594 B2* | 10/2017 | Sugunadass | H04L 45/64 |
| 9,787,776 B2* | 10/2017 | Ng | H04L 12/4625 |
| 9,832,090 B2* | 11/2017 | Bugenhagen | H04L 41/08 |
| 10,304,412 B1* | 5/2019 | Byrne | G09G 5/12 |
| 2001/0033642 A1* | 10/2001 | Abrishami | H04L 47/10 379/100.01 |
| 2003/0110288 A1* | 6/2003 | Ramanujan | H04L 63/0272 709/238 |
| 2004/0233912 A1* | 11/2004 | Droz | H04L 12/5602 370/395.21 |
| 2005/0125542 A1* | 6/2005 | Zhu | H04L 63/16 709/227 |
| 2005/0193225 A1* | 9/2005 | Macbeth | G06F 11/0709 714/2 |
| 2008/0002576 A1* | 1/2008 | Bugenhagen | H04L 41/147 370/229 |
| 2008/0114892 A1* | 5/2008 | Bruno | H04L 45/125 709/234 |
| 2009/0109867 A1* | 4/2009 | Mangetsu | H04L 43/50 370/252 |
| 2009/0252134 A1* | 10/2009 | Schlicht | H04L 1/0015 370/338 |
| 2010/0142447 A1* | 6/2010 | Schlicht | H04W 24/02 370/328 |
| 2011/0134766 A1* | 6/2011 | Zampetti | H04J 3/0682 370/252 |
| 2012/0180101 A1* | 7/2012 | Davis | H04N 21/23608 725/116 |
| 2012/0250516 A1* | 10/2012 | Aggarwal | H04L 45/22 370/238 |
| 2012/0250570 A1* | 10/2012 | Parker | H04L 43/0882 370/253 |
| 2013/0308471 A1* | 11/2013 | Krzanowski | H04L 43/0811 370/252 |
| 2014/0052825 A1* | 2/2014 | Luecke | H04L 67/327 709/219 |
| 2014/0068348 A1* | 3/2014 | Mondal | H04L 41/16 714/45 |
| 2014/0286438 A1* | 9/2014 | Apte | H04N 21/2343 375/240.26 |
| 2015/0180963 A1* | 6/2015 | Luecke | H04L 67/06 709/203 |
| 2016/0345179 A1* | 11/2016 | Chen | H04J 3/0661 |
| 2017/0201439 A1* | 7/2017 | Yang | H04L 5/006 |

\* cited by examiner

Customer Premises Equipment CPE Packet Processing

Packet IO Overview

DYNAMIC QUALITY OF SERVICE OVER COMMUNICATION CIRCUITS

RELATED APPLICATIONS

This application is a continuation of U.S. patent application Ser. No. 14/941,487 filed Nov. 13, 2015, now U.S. Pat. No. 10,178,008 which is a non-provisional of U.S. Provisional Application No. 62/079,792 filed Nov. 14, 2014. The parent applications are incorporated herein in their entirety by this reference.

COPYRIGHT NOTICE

© 2014-2015 Bigleaf Networks, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application pertains to computer networks, and more particularly, to providing dynamic quality of service (QOS) features.

BACKGROUND OF THE INVENTION

The Internet has become crucial to the every-day operations of billions of individuals, companies, and devices. Access to the Internet is provided by Internet Service Providers (ISPs). A typical business facility might have multiple "circuits" (i.e., bi-directional connections) to the Internet via multiple different ISPs. Sometimes, network connectivity is interrupted or faulty. For example, a circuit associated with one ISP can fail or become inoperable in some way, which causes Internet access through such a circuit to be cut off, become degraded, or otherwise made unavailable. As a result, the reliability and quality of service (QOS) of packets on the network, and network access itself, are diminished.

Conventional techniques attempt to address these deficiencies in different ways. For example, dual wide area network (Dual-WAN) firewalls or routers provide redundancy to Internet connectivity. But this approach employs rudimentary monitoring of circuit status to establish if a circuit is usable or not. If a circuit fails, the failure is often not detected due to the rudimentary monitoring techniques. Even if the failure is detected (often 30 to 120 seconds after the failure), the bad WAN circuit is disabled, and the other WAN circuit is put into use, which results in the source Internet Protocol (IP) address of all sessions to be changed for any traffic that was previously on the broken WAN circuit, thereby breaking any sessions that were established. This can cause voice over IP (VoIP) calls to be dropped, web pages to stop loading, and virtual private networks (VPNs) to be disconnected.

Another conventional approach involves domain name server (DNS)-based load balancer devices. In the event of a circuit failure, the device stops handing out the failed circuit's IP address in DNS responses. The destination IP address of the connection changes, so any application tied to specific IP addresses will be interrupted, including VoIP calls, VPNs, secure shell (SSH) connections, remote desktop applications, or the like. Moreover, since the IP address changes, remote users must re-initiate connections. In addition, DNS caching can cause failover from one circuit to another to malfunction. QOS implementations with DNS-based load balancer devices are essentially ineffective since the traffic has already traversed the entire Internet and ISP network before reaching the DNS-based load balancer device.

Yet another conventional approach is to use the border gateway protocol (BGP). BGP is used as the routing protocol of the Internet by sending "keep-alive" packets across interconnects between routers. If packets are not received for a given interval (usually 30 to 120 seconds), the link is declared down and traffic is re-routed. Implementing BGP at an end-customer site is often prohibitively expensive because the hardware is expensive, the setup and implementation is complex, and the ISP circuits that support BGP are also costly. In practice, ISPs don't support fast enough keep-alive timers for failover between circuits to be seamless. Instead, failover takes 30-120 seconds, resulting in end-user application session timeouts. In addition, with BGP, there is a limited amount of control as to how inbound (e.g., download) bandwidth is distributed.

Accordingly, a need remains for improved methods and systems for providing circuit-aware load balancing with dynamic quality of service. Embodiments of the invention address these and other limitations in the prior art.

Figure 1:
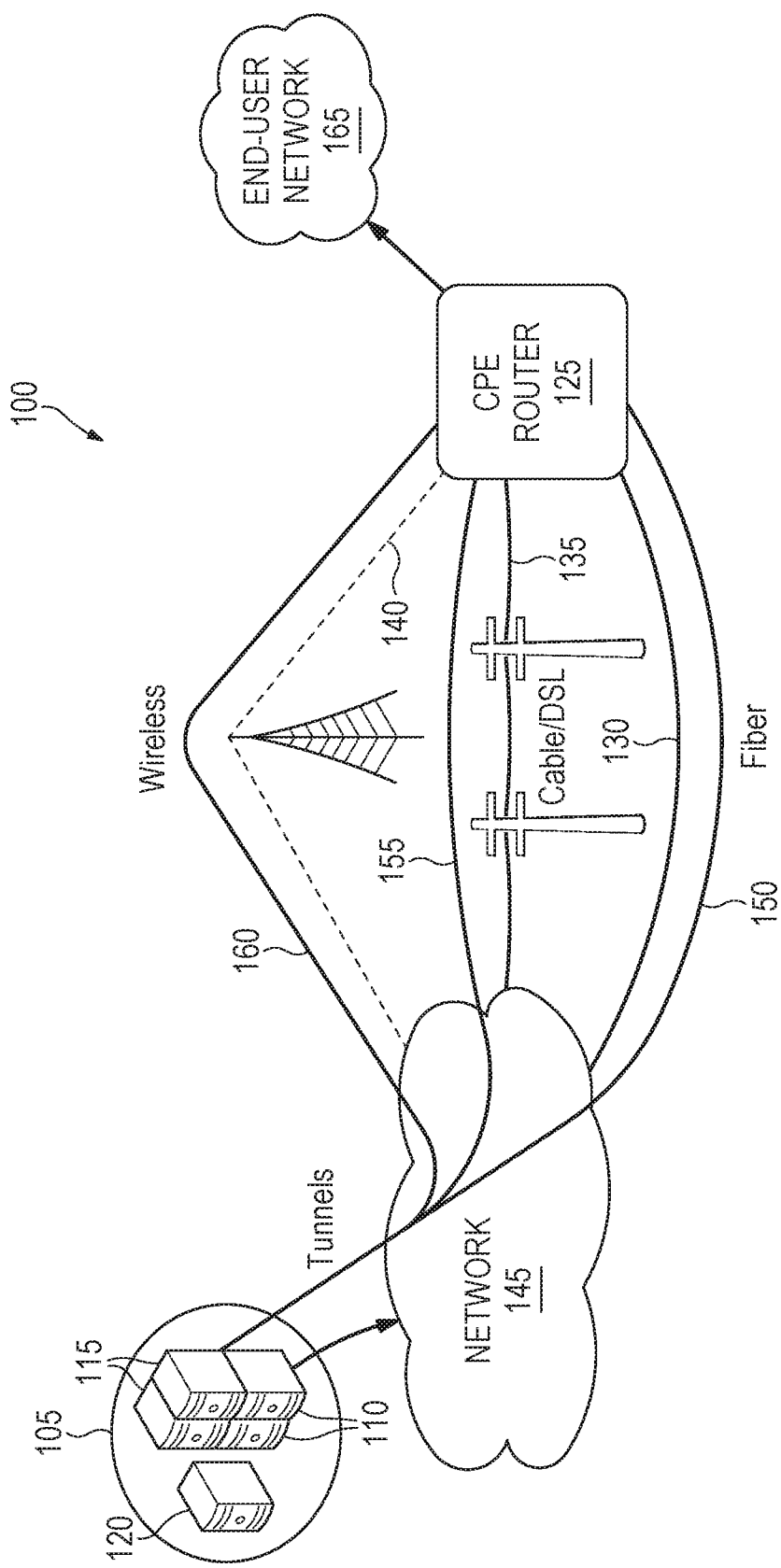
FIG. 1 illustrates an example diagram of a monitoring and load-balancing infrastructure including load-balancing devices in accordance with some embodiments of the present invention.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cellular network could be termed a second cellular network, and, similarly, a second cellular network could be termed a first cellular network, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present invention provide a monitoring and load-balancing infrastructure including circuit-aware load balancing devices, which can send packets back and forth across tunnels passing over each circuit. The monitoring and load-balancing infrastructure can determine packet-loss, latency, and/or jitter for each direction of each circuit. The load-balancing devices can send traffic over the circuit that can provide the best performance for the traffic's application or application type, adjusting in real-time as the needs of the application and/or circuit conditions change. The load-balancing devices can provide effective QOS prioritization over commodity Internet connections with changing bandwidths (e.g., such as coax/cable).

FIG. 1 illustrates an example diagram of a monitoring and load-balancing infrastructure 100 including load-balancing devices in accordance with various embodiments of the present invention.

The monitoring and load-balancing infrastructure 100 may include a core cluster 105. The core cluster 105 may include one or more core router server nodes 110, one or more tunnel endpoint server nodes 115, and optionally at least one monitoring aggregation server node 120. The functionality of these various nodes may be implemented in a variety of hardware and software; the physical servers in the drawing are merely for conceptual illustration. The monitoring and load-balancing infrastructure 100 can include a customer premises equipment (CPE) router 125, which is located at the customer or end-user premises. The monitoring and load-balancing infrastructure 100 can include multiple Internet or WAN circuits. For example, one or more fiber circuits 130, one or more cable and/or digital subscriber line (DSL) circuits 135, and/or one or more wireless circuits 140 may be included in the monitoring and load-balancing infrastructure 100.

The monitoring and load-balancing infrastructure 100 can include one or more tunnels 150 associated with the one or more fiber circuits 130; one or more tunnels 155 associated with the one or more cable and/or DSL circuits 135; and/or one or more tunnels 160 associated with the one or more wireless circuits 140. The tunnels (e.g., 150, 155, and/or 160) can pass from the cluster 105 through the network 145 (which may include the Internet), through corresponding circuits (e.g., 130, 135, and/or 140), and to a CPE router 125. The concepts of the present disclosure are not limited to the three types of circuits illustrated; they may be applied to other types of communication circuits or channels, now known or later developed. The CPE router 125 may be communicatively coupled to an end-user network 165. We refer herein to customers and end-users interchangeably.

The monitoring and load-balancing infrastructure 100 system can provide transport of customer traffic, with seamless failover and load-balancing as further explained below. The monitoring and load-balancing infrastructure 100 system can be entirely redundant with no single-point-of-failure. In some embodiments, the monitoring and load-balancing infrastructure 100 system may include QOS application programming interface (API) initialization and update scripts, IPTables rule API initialization and update scripts; and monitoring with data models, protocols, and/or thresholding and other logic.

Quality of Service (QOS)

For initialization, QOS scripts can establish initial QOS rules on appropriate interfaces to rate-limit various traffic classes. Traffic can be rate-limited on egress, passing from a system element towards the ISP circuit. On the cluster-side systems 105, for example, the classes can be unique per customer site (165). In a preferred embodiment, rules may provide for eight (8) traffic classes with independent prioritization and rate-limiting. The traffic classes, and their differentiated services code point (DSCP) values, some of which can be arbitrarily assigned, may include: i) Network control—DSCP 56, ii) System control—DSCP 48, iii) VoIP—DSCP 46, iv) High-Priority Interactive—DSCP 38, v) Medium-Priority Interactive—DSCP 30, vi) Low-Priority Interactive—DSCP 26, vii) Large Transfers—DSCP 14, and/or viii) Other/Default—DCSP 6. The number and types of these traffic classes are merely illustrative and not limiting. In some embodiments, packet marking mechanisms other than DSCP may be used; it is merely an example.

Further for initialization, the QOS scripts can implement Hierarchical Token Bucket (HTB) classful queuing based on the eight (8) traffic classes, with varying priorities, rates, and/or ceilings, to provide effective prioritization of traffic. In some embodiments, the initial rate and ceiling for the classes are no higher than the maximum speed of the associated WAN circuit. Updating of the HTB traffic control (TC) rate and ceiling values on demand can be provided through a provided API.

Conventional QOS implementations require that all QOS-prioritized traffic traverse user-controlled networks so that QOS markings and prioritization can be honored. Using conventional techniques, the moment that a packet exits a user-controlled network (e.g., on to an ISP's network) the user loses control of the prioritization, because it's very likely that the other network will overwrite or not honor the QOS settings on the packet. Moreover, conventional techniques for imposing artificial rate-limits on their traffic via a router or firewall, such as rate-limiting a 20 Mbps circuit to 15 Mbps, are wasteful and generally ineffective for many types of network traffic.

In accordance with embodiments of the present inventive concept, a measurement and adaptation system is provided to determine accurate circuit speeds to input into QOS policies in real-time. The monitoring and load-balancing infrastructure 100 preferably is arranged to implement monitoring packets that pass back and forth between time-synchronized network nodes, across the public Internet. Such nodes (e.g., the tunnel-endpoint nodes 115 and the CPE router node 125) can determine packet-loss, latency, and jitter for each circuit.

When an endpoint server node 115 and/or the CPE router 125 detect a marked increase in one of these metrics, it can first try to determine if the circuit has become saturated. The endpoint server nodes 115 and/or the CPE router 125 can do this by decreasing the internal rate-limits, for example, to 50%-70% of the corresponding circuit's rated speed, and then monitoring whether the poor circuit quality condition is improved. If that change was successful, then the endpoint server nodes 115 and/or the CPE router 125 can iterate over a set of new rates to find the highest possible rate that does not cause degraded performance. If the change was not successful, then the circuit quality issue is determined to be due to some factor other than circuit saturation, and the routing rules are updated accordingly. The endpoint server nodes 115 and/or the CPE router 125 can each include logic sections that are configured to execute such functions for each traffic direction, thereby improving scalability since the load is distributed. For example, the endpoint server nodes 115 and/or the CPE router 125 can watch received monitoring packets for data, and then control outbound user traffic responsive to the monitoring data.

To effectively apply a Quality of Service (QOS) policy to a network link, the bandwidth capacity of the network link should be known. On a fiber or T1 circuit, determining the capacity is relatively straight forward since the circuit has contract-guaranteed throughput. On a DSL or Cable circuit, it is not so straight forward, and presents a problem since the last-mile or middle-mile network components may routinely become saturated, causing decreases in circuit capacity that are unknown to the endpoint routers 115 and the CPE router 125 where the QOS policies are applied. In a preferred embodiment, each of the nodes (e.g., 115 and 125) can control outbound traffic to the other node, so each can play a similar or same role for monitoring and QOS, just in different directions.

The monitoring and load-balancing infrastructure 100 includes a capacity-detection mechanism. The capacity-detection mechanism can work in concert with a circuit-performance detection system. An underlying premise is that when circuit performance degrades, it is most often due to bandwidth saturation and/or capacity constraints. When an Internet link is saturated (i.e., no more capacity), packets can build up in the ISP router's buffers, causing increased packet-loss, latency, and jitter, without the ability for the endpoint router QOS policies to correct the issue.

When the monitoring and load-balancing infrastructure 100 detects an increase in one of these metrics beyond certain set thresholds, the monitoring and load-balancing infrastructure 100 can first determine if the particular circuit has become saturated. As mentioned above, this can be done by decreasing the internal per-circuit QOS policy rate-limits to 50%-70%, or other suitable value that is configurable by a network administrator, of the circuit's rated speed, then monitoring if the poor circuit performance condition is eliminated for a configured brief period (e.g., 3 seconds) of time. If that change was successful, then the system can iterate over a set of new rates between the maximum "rated speed" and the minimum (50%-70%) value to find the highest possible rate that does not cause degraded performance. If the change was not successful, then the circuit performance issue is determined to be due to some factor other than circuit saturation, and the routing rules can be updated via a load balancing mechanism.

Figure 5:
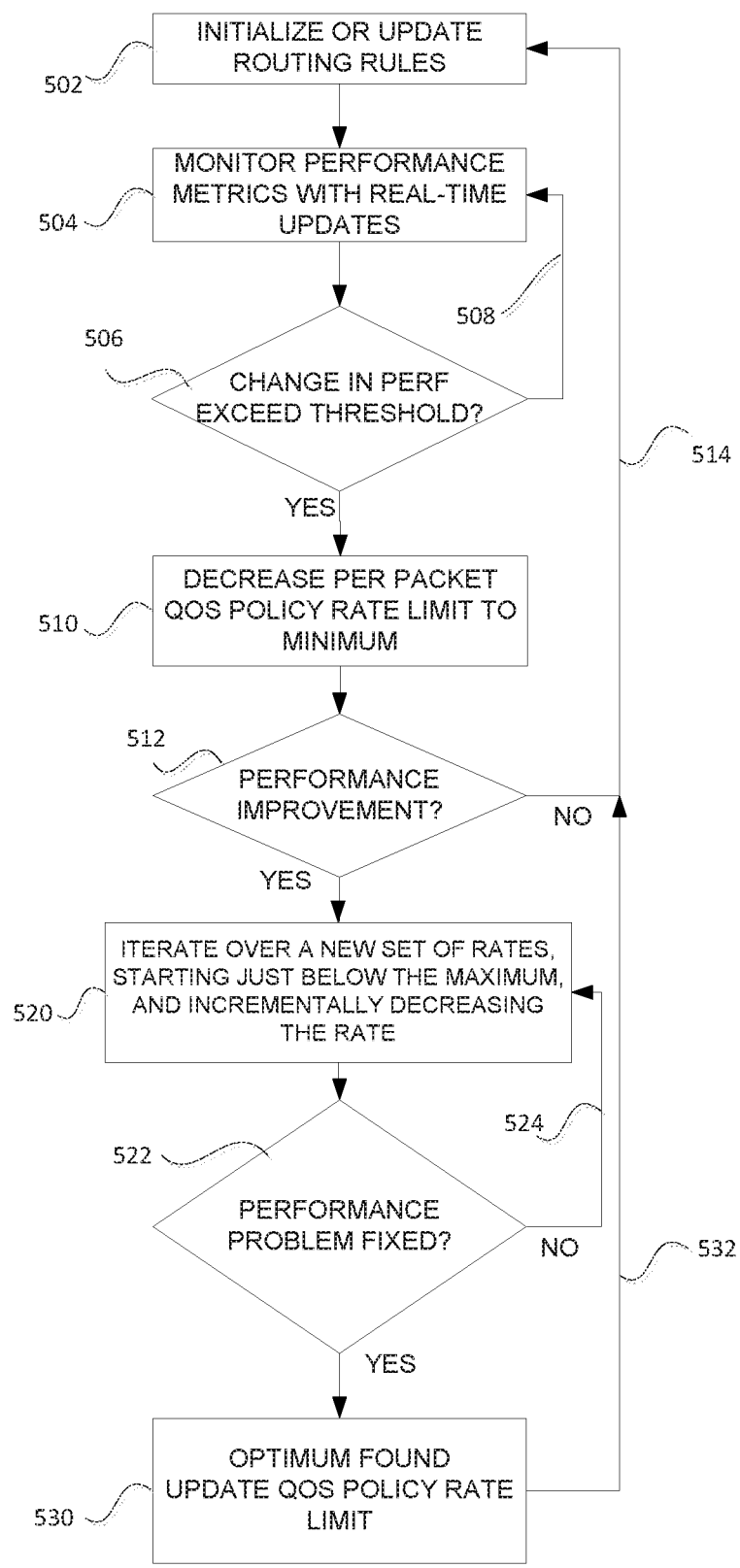
FIG. 5 is a flow diagram illustrating an example of a method for monitoring circuit performance and optimizing QOS policy rate limits in accordance with some embodiments of the present invention.

FIG. 5 is a simplified flow diagram illustrating an example of this process for monitoring circuit performance and adjusting QOS policy rate limits. Circuit performance may be monitored, as mentioned, by sending monitoring packets through respective tunnels for each available circuit, as illustrated in FIG. 1. In FIG. 5, block 504 illustrates monitoring performance metrics for each circuit with real-time updates in each direction. These metrics may include packet loss, jitter, and latency. In decision block 506, the system detects whether a change in performance metrics exceeds a predetermined threshold value. If not, monitoring continues via loop 508.

In an embodiment, multiple values may be monitored, for example, alarm levels 0-7 for each metric such as loss, latency, and jitter. Further, one or more of these metrics may be averaged over one or more time periods. An averaging period may be, for example, 4 sec (a "short" averaging period) or 90 sec (a "long" averaging period). These values are merely illustrative and not limiting. Preferably, moving averages may be used. The time periods may be changed in appropriate circumstances.

If a threshold change is exceeded (YES branch from 506), the system decreases the per packet QOS policy rate limit, first to a selected minimum value, block 510. This may be, for example, 70% of the initial setting. Then the system checks whether performance improved, decision 512, by checking the latest performance metrics. If it did not, one can infer the performance was not due to saturation, and the process continues via loop 514.

If the rate decrease did improve performance, the process continues to block 520 iterate over a new set of rates. That is, it may begin just below the maximum value QOS policy rate limit, and then re-check the performance metrics to see whether the performance problem persists, see decision block 522. If performance is not restored to acceptable metrics, decision 522, the process loops via 524 and incrementally decrements the policy rate, block 520, and again checks the effect. Once the performance problem is fixed, the optimum rate has been found, block 530, and this rate is used to update the policy. The decrementing step size may be constant or varied.

IP Tables

IPTables is a command line utility for configuring Linux kernel firewall implemented within the Netfilter project. The term iptables is also commonly used to refer to this kernel-level firewall. It can be configured directly with iptables, or by using one of the many frontends and GUIs. iptables is used for IPv4 and ip6 tables is used for IPv6. iptables is used to inspect, modify, forward, redirect, and/or drop IPv4 packets. The code for filtering IPv4 packets is already built into the kernel and is organized into a collection of tables, each with a specific purpose. The tables are made up of a set of predefined chains, and the chains contain rules which are traversed in order. Each rule consists of a predicate of potential matches and a corresponding action (called a target) which is executed if the predicate is true; i.e. the conditions are matched. iptables is the user utility which allows you to work with these chains/rules. Some of these rules are further discussed below.

For initialization, IPTables rule "scripts" can import average round-trip latency alarm levels for each circuit that were determined by endpoint server nodes 115 and/or the CPE router 125. We use the term scripts in this application not in a limiting sense that would require that they be written in a scripting language. We use the term more broadly to include "scripts" that are interpreted by another program at runtime, as well as other software code, programs, routines, functions, etc. capable of carrying out the functionality ascribed to them. The rule scripts logic can import hard-coded or dynamically created data for each site and circuit. Preferably, the data includes for each circuit: i) current capacity in the relevant direction, ii) current one-way latency alarm level in the relevant direction, iii) current one-way jitter alarm level in the relevant direction, and/or iv) current one-way packet loss alarm level in the relevant direction.

If the round-trip latency alarm is worse than the one-way latency alarm, then the IP tables rule generation logic can use the round-trip alarm value as the latency alarm value. The IP tables rule generation logic can create a base overall score for each circuit, including the aggregate value of all the alarms for the circuit. The IP tables rule generation logic can evaluate all circuits to determine if each is eligible for real-time traffic, having low packet loss, latency, and jitter. If the circuit is eligible, then the IP tables rule generation logic can add it to the real-time load-balancing circuit set for the particular site. The IP tables rule generation logic can take into consideration whether the speed of the circuit is above a threshold value, e.g. 900 kbs, and/or whether the total score for the circuit is less than a certain level, e.g. 2.

The IP tables rule generation logic can evaluate all circuits to determine whether each is eligible for large-transfer traffic, having moderate or low packet loss and high throughput, but can tolerate higher latency or jitter. If the circuit is eligible, then the IP tables rule generation logic can add it to the high-throughput load-balancing circuit set for the site. The IP tables rule generation logic can take into consideration whether the packet loss and latency alarms are below certain threshold levels, e.g. 3 and 4, and/or whether the speed of the circuit is above a threshold value, e.g. 89 Mbps, or at least ½ the speed of the fastest circuit at the particular site.

Moreover, the IP tables rule generation logic can evaluate all circuits to determine if each is eligible for high-load large-transfer traffic, similar to large-transfer traffic, but with less stringent throughput requirements, to be used in high-load conditions. If the circuit is eligible then the IP tables rule generation logic can add the circuit to the high-load load-balancing circuit set for the particular site. The IP tables rule generation logic can take into consideration whether the packet loss and latency alarms are below certain threshold levels, e.g. 3 and 4. The IP tables rule generation logic can also take into consideration whether the speed of the circuit above a threshold value, e.g. 14 Mbps, or at least ⅕th the speed of the fastest circuit at the site.

In addition, the IP tables rule generation logic can evaluate all circuits to determine if each is eligible for general-use traffic, requiring moderate or low packet loss and moderate throughput, but can tolerate higher latency or jitter. If the circuit is eligible, then the IP tables rule generation logic can add the circuit to the general-use load-balancing circuit set for the particular site. The IP tables rule generation logic can take into consideration whether the packet loss and latency alarms are below certain threshold levels, e.g. 3 and 4. The IP tables rule generation logic can take into consideration whether the speed of the circuit is above a threshold value, e.g. 1.3 Mbps, and at least ¹⁄₁₀th the speed of the fastest circuit at the particular site.\

To summarize, a given circuit may be assigned to one or more categories or circuit sets. The three circuit sets described above—(a) high-throughput, (b) high-load (large transfer), and (c) general use are illustrative; other circuit sets may be applied. There may be a lesser or greater number of circuit sets. Other names may be used as well, for example, these could be called "bulk transfers", "transactional", "VoIP", and others. The concept is important, not the particular names selected.

For each load-balancing set for each site, if more than one (1) circuit exists in the set, the IP tables rule generation logic can calculate bandwidth ratios across all circuits in the set to determine ratios that traffic should be applied to the circuits for even load balancing.

Figure 6:
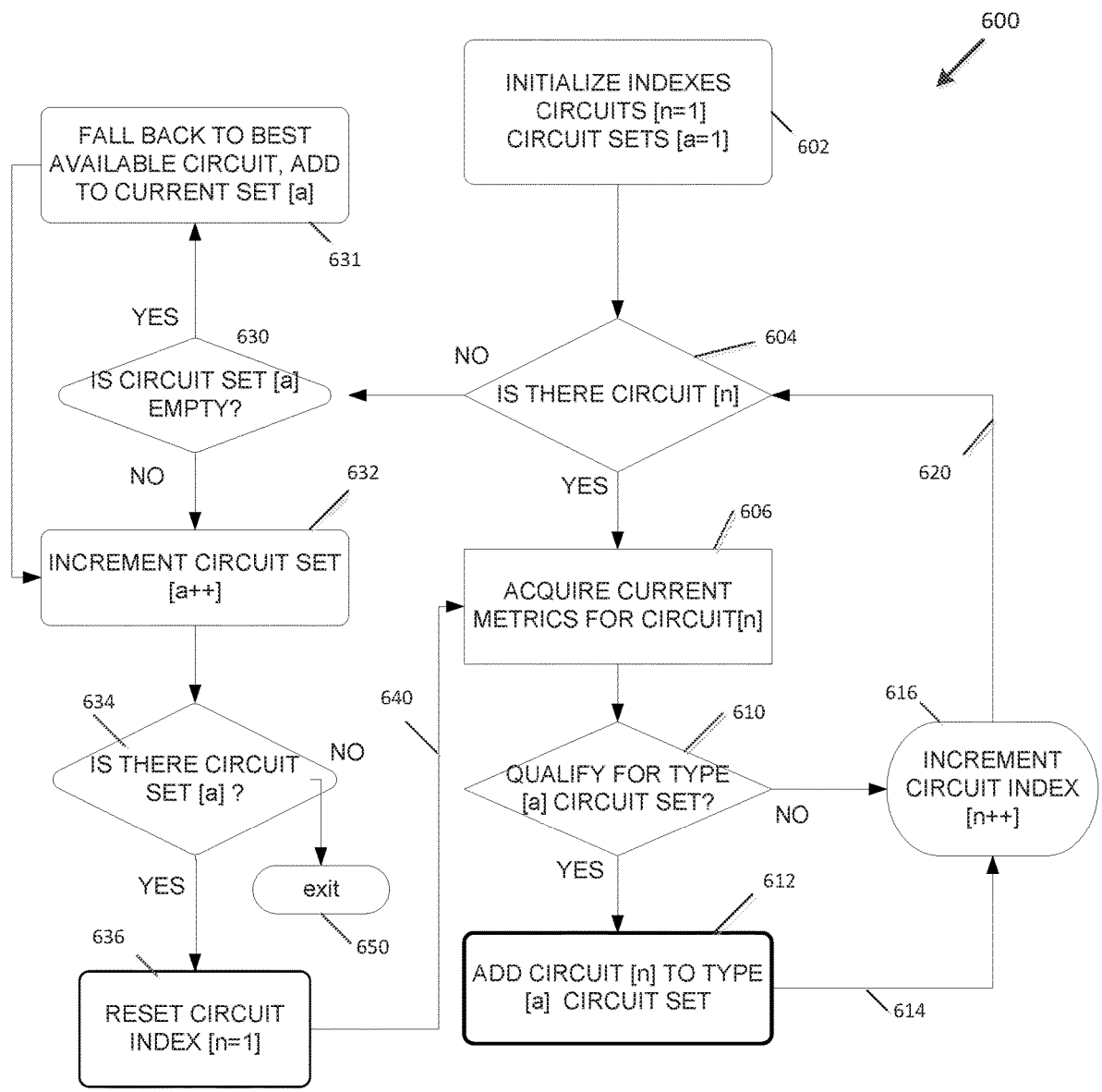
FIG. 6 is a flow diagram illustrating an example of a method for monitoring circuit performance and dynamically assigning available circuits to circuit sets to carry corresponding categories of packet traffic in accordance with some embodiments of the present invention.

One process 600 for dynamically assigning circuits to circuit sets is illustrated by the flow diagram of FIG. 6. At block 602 we initialize indexes for circuits as an integer [n] and sets of circuits (or circuit sets) by an integer [a]. For example, there may be three circuits available, illustrated as 140 (wireless), 135 (cable/DSL) and 130 (Fiber) in FIG. 1. Different circuit sets are utilized for different classes of customer traffic as further explained below. In one example, there may be circuit sets as follows: i) real-time set; ii) high-throughput set; and iii) general-use set. In FIG. 6, for a first circuit, the process acquires current performance metrics, block 606, and determines at decision 610 whether or not the current circuit [n] meets the performance criteria for the current circuit set [a]. If not, the process increments the circuit index [n++], block 616, and loops via 620 to determine if another circuit is present, decision 604. If so, the process continues to 606 to again acquire performance metrics for the current circuit. If the circuit [n] meets the criteria, decision 610, it is added to the current circuit set [a], block 612. Next the process again increments the circuit index [n++] at block 616 and loops via 620 to the next circuit, if there be one. In this way, all circuits that currently meet the necessary performance criteria are assigned to the circuit set.

After all available circuits have been considered (NO branch from 604), a decision 630 checks whether any circuits were assigned to the current set [a]. If there are none (circuit set [a] is empty), the system can fall back to the best available circuit, block 631, and assign it to the current circuit set, so that all traffic types are accommodated. After at least one circuit is assigned to the current set, we increment [a], block 632, and check whether all the circuit sets have been processed, decision 634. If not, we reset the circuit set index [n==1] at block 636, and then return to block 606 via path 640 to cycle through all the circuits, this time checking for qualification to be assigned to the current circuit set. As before, the process loops via 620 until all circuits are considered for the current circuit set. After all circuit sets have at least one assigned circuit, this process exits at 650.

The generated IP tables rule set can include a packet analysis and marking rule set from the imported and calculated data. The generated IP tables rule set can send all customer traffic through a distinct rule set (e.g., an application identification chain), using ports, IP addresses, packet sizes, text strings, or other available IPtables rules and/or extensions to match on packet characteristics. The generated IP tables rule set can tag each matched packet with DSCP values to identify priority, assigning them into the eight (8) possible priority levels as noted in the section on the QOS scripts. The generated IP tables rule set can restore any previous connection marks on all packets. The generated IP tables rule set can track the number of current high-throughput connections to determine general site load for high-throughput traffic. If the connection mark corresponds to the current rule timestamp, then the generated IP tables rule set need not re-load balance the packet. If the connection mark is an old or default timestamp, then the generated IP tables rule set can redirect the packet to the site load-balancing chain. Within the site load-balancing chain, the generated IP tables rule set can set packet marks on packets according to the various load-balancing sets for the site for each priority level.

Example priority level mapping include: i) real-time set: DSCP values 56, 46, 38, and 30, ii) high-throughput set: DSCP value 14, and/or iii) general-use set: DSCP values 48, 26, and 6. Within the site load-balancing chain, if the site is under a high-load condition for large transfers, then the generated IP tables rule set can re-mark any new high-throughput connections using the high-load load-balancing set. Within the site load-balancing chain, the generated IP tables rule set can apply and save the new timestamp to each packet that was load-balanced; to ensure that same flow is not re-load-balanced unless a new rule set is created. The generated IP tables rule set can convert the packet marks into usable values for IP rules to match on later during the routing process. The generated IP tables rule set can load the new IP tables packet analysis and marking rules into use.

Monitoring Aggregation and Load Balancing

For updating, an API may be provided for the endpoint server nodes 115 and/or the CPE router 125 to call updates to the packet analysis and marking rules for a particular site. The endpoint server nodes 115 and/or the CPE router 125 of the core cluster 105 can accept input at script execution, importing alarm values for each circuit's latency, jitter, and packet loss. The endpoint server nodes 115 and/or the CPE router 125 of the core cluster 105 can perform the same import and scoring processes as noted above for the initialization script, except using the new alarm values inputted to the script. The endpoint server nodes 115 and/or the CPE router 125 of the core cluster 105 can evaluate the current IP tables packet analysis and marking rule set to determine how to replace the site's load-balancing rules. The endpoint server nodes 115 and/or the CPE router 125 of the core cluster 105 can generate new load-balancing rules, in the same or similar fashion as the initialization script. The endpoint server nodes 115 and/or the CPE router 125 of the core cluster 105 can apply the new load-balancing rules to the IP tables packet analysis and marking configuration without interrupting traffic. The endpoint server nodes 115 and/or the CPE router 125 of the core cluster 105 can do this by first creating the new rules alongside the old ones, then deleting the old ones. The endpoint server nodes 115 and/or the CPE router 125 of the core cluster 105 can apply a new timestamp to all the newly generated rules, to ensure traffic is immediately re-load balanced, but just for the affected site.

The endpoint server nodes 115 and/or the CPE router 125 can establish connections within the tunnels (e.g., 150, 155, and 160) for passing monitoring packets back-and-forth between the tunnel endpoints 115 and the CPE routers 125. The endpoint server nodes 115 and/or the CPE router 125 can maintain unique instance numbers for each connection to ensure continuity of connectivity and matching settings between instances. The monitoring endpoint server nodes 115 and/or the CPE router 125 can send monitoring packets to the remote peer at regular intervals (e.g., every 100 ms), buffering and discarding as appropriate to maintain accurate statistics and proper performance. Each packet can include, for example: i) the sending timestamp, ii) the instance, iii) an incrementing packet index, iv) most recent calculated short-term statistics (latency, loss, jitter), and/or v) most recent calculated long-term statistics (latency, loss, jitter). The endpoint server nodes 115 and/or the CPE router 125 can store local data about the circuit transmit performance statistics based on the packets the remote host is sending.

The endpoint server nodes 115 and/or the CPE router 125 can store local data about the circuit receive performance statistics based on the delivery performance of the packets from the remote host. The endpoint server nodes 115 and/or the CPE router 125 can store local data about the jitter performance statistics, based on a system of average buckets, where each bucket corresponds to a jitter alarm level, and bucket counters are incremented based on the jitter of packets as they are received. The endpoint server nodes 115 and/or the CPE router 125 can store severity breakpoints for generating alarm values (e.g., 0-7) from latency, loss, and jitter statistics, both long-term (e.g., 90 seconds) breakpoints and short-term breakpoints (e.g., 4 seconds). The endpoint server nodes 115 and/or the CPE router 125 can create a modified-moving-average latency floor variable to be used when comparing received packet timestamps from the remote host, to determine one-way circuit latency.

The endpoint server nodes 115 and/or the CPE router 125 can receive monitoring packets from the remote peer. The endpoint server nodes 115 and/or the CPE router 125 can i) evaluate the received packet for validity and errors, ii) update locally stored values for transmit latency, loss, and jitter based on the contents of the packet, compared against the severity breakpoints, iii) determine the latency of the link in the receive direction by evaluating the difference between the latency floor and the received timestamp, iv) update the latency floor reference point for the monitoring session based on the received remote host timestamp, v) update the local values for received latency, loss, and jitter, and/or vi) perform thresholding on the received packet's new data to determine if any system modification actions are required.

Performing the thresholding on the received packet's new data can include determining if rate-limit change is required to adapt QOS policies. If alarms exist on the circuit, beyond the rate-limit adaptation threshold (e.g., 2), then the endpoint server nodes 115 and/or the CPE router 125 can drop the rate to the minimum value set for the circuit and wait for the evaluation period (e.g., 4 seconds) to see if alarms go away. If rate limit was previously dropped to minimum but alarms persist, then the endpoint server nodes 115 and/or the CPE router 125 can reset the rate to maximum and back off for an increasing interval. If the rate-limit was dropped to the minimum and the alarms went away, then the endpoint server nodes 115 and/or the CPE router 125 can increase the rate-limit to the maximum value, minus the difference between the minimum and maximum values, divided by the step quantity value (e.g. 5). This is the beginning of the step-down process.

Performing the thresholding on the received packet's new data can further include: if the rate-limit is going through the step-down process, but alarms persist, then the endpoint server nodes 115 and/or the CPE router 125 can continue to step the rate down by the difference between the minimum and maximum values, divided by the step quantity value (e.g. 5). If rate limit was previously stepped down to resolve alarms, and alarms are now gone, then the endpoint server nodes 115 and/or the CPE router 125 can accept the new rate as the current available circuit throughput. The endpoint server nodes 115 and/or the CPE router 125 can periodically (e.g., every 30 minutes) reset the rate-limit to the maximum value.

If a rate-limit change is required, then the endpoint server nodes 115 and/or the CPE router 125 can call the QOS update script to update the active rate-limits on the appropriate circuit.

If a rate limit change is not required, then the endpoint server nodes 115 and/or the CPE router 125 can determine if a routing change is required. In other words, the rate can be tested first, while not modifying the routing, as it could cause false resolution of an alarm condition if traffic was to move to a new circuit. Determining whether the routing change is required can include determining whether the short-term or long-term alarms should be used. If the sum of the short-term alarms is greater than the sum of the long term alarms plus a predefined value (e.g., 2), and is greater than the most recent alarms used (for the last packet), then the endpoint server nodes 115 and/or the CPE router 125 can use the short-term alarms. Or, if the short-term alarms were recently used (e.g., within 90 seconds) and are still worse than the long-term alarms, then the endpoint server nodes 115 and/or the CPE router 125 can use the short-term alarms. Otherwise the endpoint server nodes 115 and/or the CPE router 125 can use the long-term alarms. If the chosen alarms changed as compared with the last packet, then the endpoint server nodes 115 and/or the CPE router 125 can call the IPTables packet analysis and marking update script to update the routing configuration with the new alarms.

Statistics can be regularly sent to the monitoring aggregation node 120 with current packet-loss, latency, jitter, and/or rate-limit values. The monitoring aggregation node 120 can log data, provide user access, and/or provide reporting. In other words, the monitoring aggregation node 120 can aggregate the data for later display to a user.

Conventional load-balancing implementations do not adapt to changing circuit conditions based on monitored data gathered across the specific Internet path(s) that the user traffic is traversing, and are unaware of circuit performance issues like packet-loss, latency, and jitter. The monitoring and load-balancing infrastructure 100 in accordance with embodiments of the inventive concept can classify unidirectional circuit behavior via monitoring packets to determine packet-loss, latency, jitter, and total throughput. The monitoring and load-balancing infrastructure 100 can also separately classify the connection type of each incoming user packet, to determine what type of application the packet likely belongs to (e.g., VoIP, chat, web browsing, file uploads, etc.). Each application traffic flow can then be lumped into one of several categories, such as: "high-throughput," "real-time," or "regular." Then the system routing can be updated to send each of the traffic categories over the circuit or set of circuits best suited for that traffic type, according to the current monitoring data, as explained above. If, at any time, circuit conditions change beyond set thresholds, then the selection process can be re-run with the new data. The monitoring, classification, and routing decisions can all be made unidirectional, so each circuit can be most optimally utilized regardless of differences in upstream and downstream performance.

Embodiments of the present inventive concept can provide public Internet access. Alternatively or in addition, the monitoring and load-balancing infrastructure 100 can be implemented to provide private network connectivity. Also, the QOS and monitoring techniques disclosed herein can be implemented apart from the base system of tunneling the users traffic. The monitoring and load-balancing infrastructure 100, or elements thereof, can be implemented in smaller network segments, such as between two or more routers.

The monitoring and load-balancing infrastructure 100 disclosed herein provides Internet connection load balancing and redundancy in an intelligent and automated fashion. Monitoring packets can be sent regularly back and forth across IP network tunnels that traverse each of two or more Internet connections to a customer location. The tunnels can connect between an on-site router device 125 at the customer location, and one or more servers in a core cluster 105. The one or more servers in the core cluster 105 can implement firewall-style rules to classify the connection type of each incoming customer data packet (e.g., based on standard values like packet size, IP address, or port number), to determine what type of application the packet likely belongs to (e.g. VoIP, chat, web browsing, file uploads, etc.).

The monitoring traffic can be sent and examined in a uni-directional fashion, providing unique statistics for upload and/or download performance. Based on timestamps on each monitoring packet and the number of packets received, latency, jitter, and packet-loss statistics can be calculated for each direction of each circuit and updated in real-time as conditions change. This data can then be passed back to the remote device.

Each classified application traffic flow can be put into one of several categories, e.g.: "high-throughput," "low-latency/jitter/loss," or "regular." The system can then evaluate which circuit or set of circuits is best suited for each application category, based in part on pre-set thresholds and/or on the real-time data from the monitoring system. Based on the circuit "assignments," routing configuration can be updated in real time to apply customer traffic to the appropriate circuit(s). When the monitoring data change beyond certain thresholds, the evaluation process can be re-run to again determine the best application/circuit fit.

CPE Packet Processing

Figure 2:
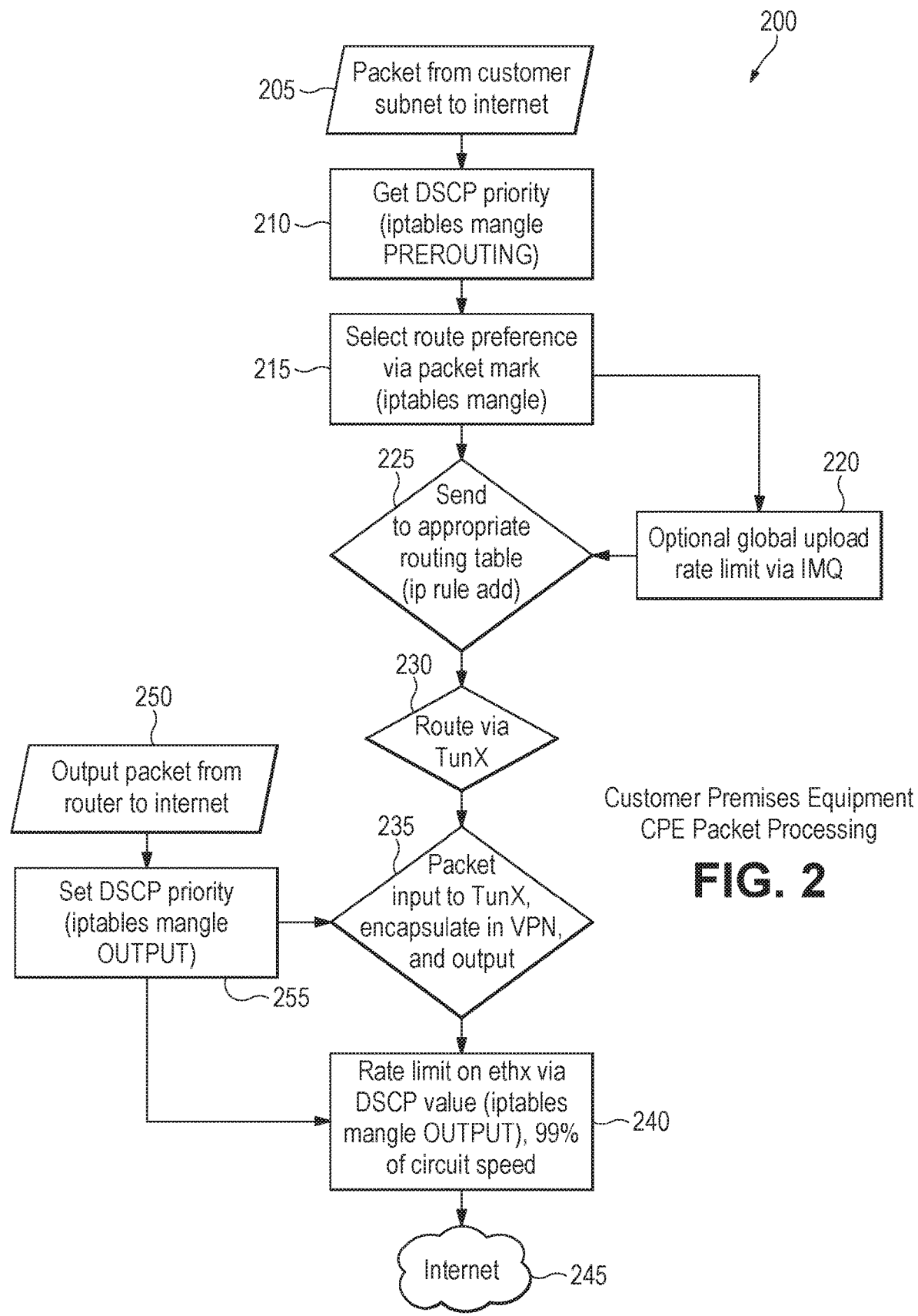
FIG. 2 shows a flow diagram illustrating one example of a method for customer premises equipment (CPE) packet processing in accordance with some embodiments of the present invention.

FIG. 2 shows a flow diagram 200 illustrating a technique for customer premises equipment (CPE) packet processing in accordance with various embodiments of the present invention. The technique begins at 205 where a packet from a customer subnet is sent. At 210, a DSCP priority is set, for example, using IP tables packet analysis and marking pre-routing. At 215, a route preference is selected via packet mark, for example, using the IP tables packet analysis and marking rules. The flow proceeds to either 220, where an optional global upload rate limit can be set via intermediate queuing (IMQ), or directly to 225, where the packet is sent to an appropriate routing table (e.g., IP rule add). At 230, the packet is routed via a tunnel (e.g., TunX). At 235, the packet is input to the tunnel, encapsulated in VPN, and then output.

At 240, a rate limit can be set on a network interface ethx (e.g., eth0, eth1, etc.) based on the DSCP value. The rate limit can be set using a traffic control utility (e.g., Linux® TC utility) and/or managed by a QOS script or API. In this application we use "TC" to abbreviate the term traffic control, without implying limitation to any particular software. The DSCP value can be analyzed to determine which traffic class, and therefore, which rate-limiting class the packet belongs to. The packet can be sent to the Internet at 245.

At 250, an administrative or monitoring packet can be output from the CPE router (e.g., 125 of FIG. 1) to the Internet. Monitoring packets are generated internally by the CPE router. At 255, a DSCP priority can be set, for example, using IP tables packet analysis and marking output. The flow can proceed to either 235 or 240 for further processing.

Figure 3:
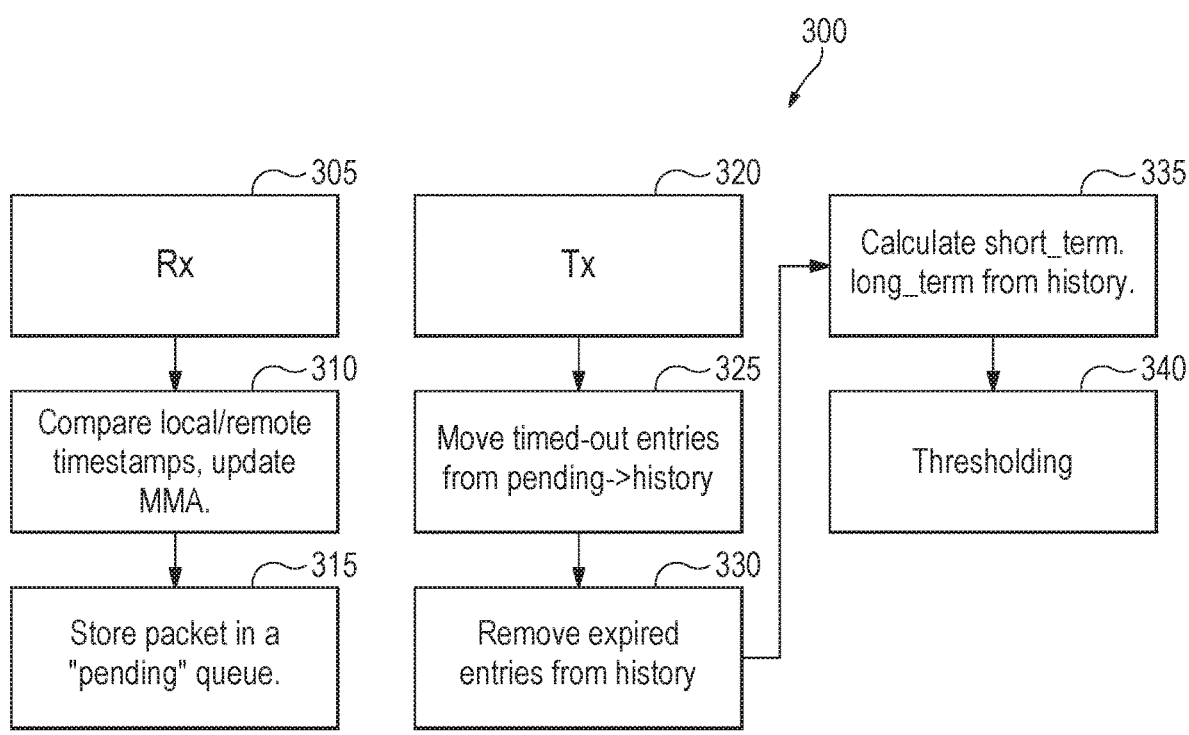
FIG. 3 illustrates a schematic block diagram including a packet input/output (I/O) overview in accordance with various embodiments of the present invention.

FIG. 3 illustrates a schematic block diagram 300 including a packet input/output (I/O) overview in accordance with various embodiments of the present invention. For receive transactions (i.e., Rx) at 305, a local timestamp can be compared with a remote timestamp, and a modified moving average (MMA) can be updated to provide a latency baseline. Because clocks on the CPE 125 and endpoint servers 105 may drift by 10s of milliseconds, the MMA provides an ability to adapt to that. This MMA is used to establish a "zero" latency point based on the measured relative latency for example, over the last e.g. 24 hours. The system then measures latency against this baseline. Latency "problems" are deviations/spikes from that baseline metric. At 315, a packet can be stored in a "pending" queue.

For send transactions (i.e., Tx) at 320, timed-out entries can be moved from a pending status to a history at 325. At 330, expired entries can be removed from the history. At 335, a short-term value and a long-term value can be calculated from history for a given circuit. Specifically, for latency, the values refer to deviation from the baseline value described above. For jitter, the values may be the numbers of entries in various buckets. For packet loss, the values of interest may be an average number. Given these values or metrics, the system proceeds at 340 to a thresholding operation.

Figure 4:
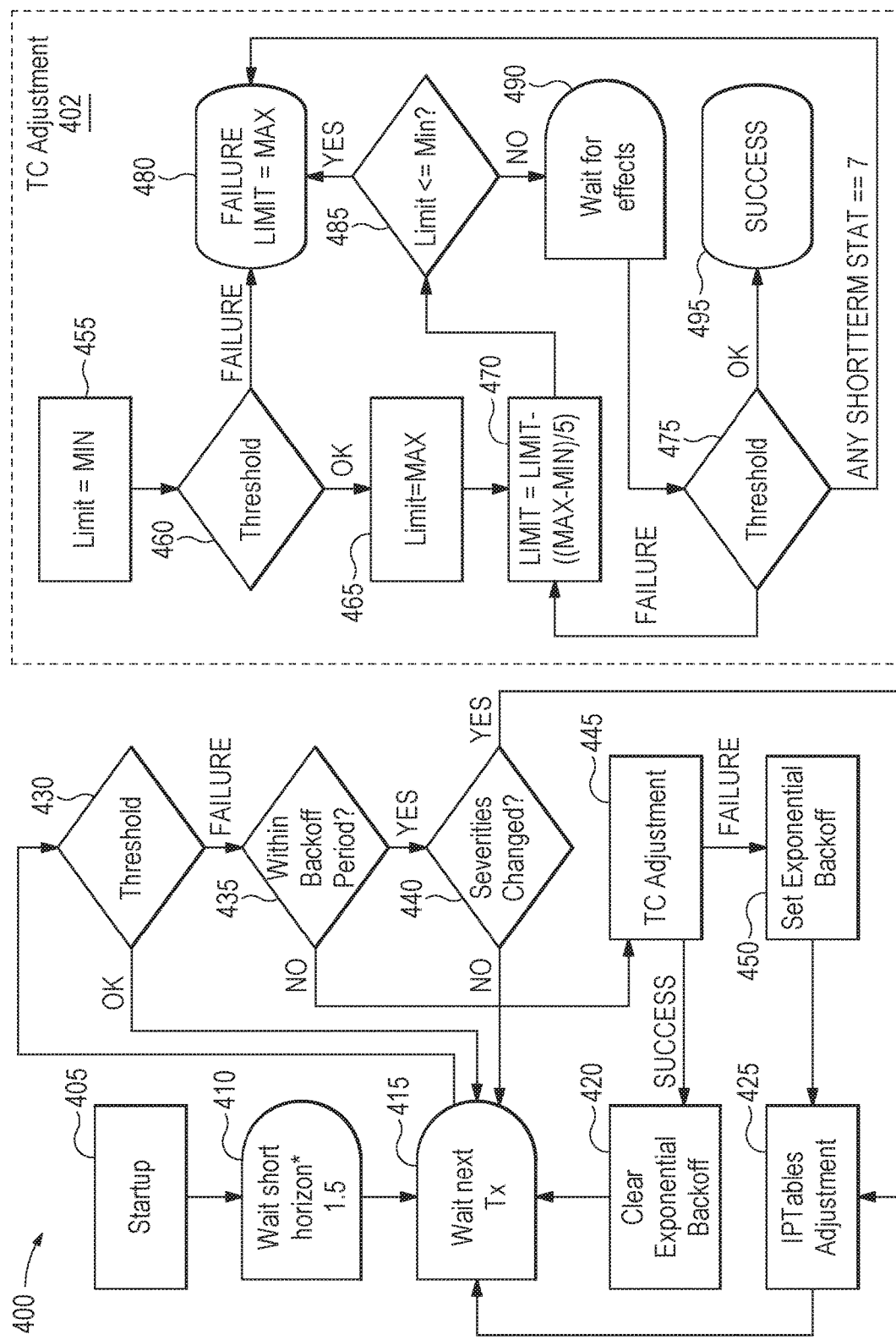
FIG. 4 is a flow diagram illustrating an example of a thresholding technique in accordance with some embodiments of the present invention.

FIG. 4 is a simplified flow diagram 400 illustrating a thresholding technique for a given circuit in accordance with various embodiments of the present invention. The thresholding process preferably is implemented in software. The software may be executed by a processor, for example, in a router, other networking device, or a server, PC, etc. The technique begins at startup 405. At 410, the system can wait for a short horizon or time period. At 415, the system can wait for a next send transaction Tx. At 430, a threshold can be checked. If status is okay or otherwise met ("OK"), the flow returns to 415 to wait for another send transaction Tx.

Otherwise, if the threshold test 430 fails, i.e., if one or more predetermined alarm thresholds are exceeded on the circuit, the flow proceeds to 435 where a determination is made whether it is within a current backoff period. If YES, the flow proceeds to 440 to check whether alarm levels ("severities") have changed, relative to corresponding thresholds. If NO, flow returns to 415 to wait for the next TX. If conditions have changed, flow proceeds to 425, where IP tables rules are adjusted by reevaluating the load-balancing rules described above, and then back to 415 to wait for another send transaction Tx.

Alternatively, if it is not within the backoff period (test 435), flow proceeds to 445 for a TC (traffic control) adjustment to attempt to correct the cause of the threshold failure. The TC process, detailed below, only succeeds if all alarms (loss, latency, and jitter) go back to 0 values, dropping under the threshold for the 0-alarm point. For example a 1-alarm threshold for packet-loss might be 0.5%, so if loss drops to 0.3% then it will be a 0-alarm level, and this will succeed. If it succeeds, the process next clears the exponential back-off, block 420, and again returns to 415. If the TC adjustment fails to correct the problem, the flow proceeds to 450 to apply an exponential backoff, and then along to 425. If the TC adjustment succeeds, the flow proceeds to 420 where any exponential backoff is cleared, and then to 415 to wait for another send transaction Tx.

Dashed box 402 shows a more detailed view of a representative TC adjustment process. At 455, the QOS rate limit for the circuit (in the relevant direction) is set to a minimum value MIN. At 460, a determination is made whether the threshold criteria are met. If not met or otherwise failed, the flow proceeds to 480 where the limit is set to a maximum threshold. Otherwise, if threshold criteria are met at 460, the flow proceeds to 465 where the limit is first set to a maximum value, and then to 470, where the limit is decremented, for example, by ((maximum threshold−minimum threshold)/5). This divisor is merely illustrative; other values may be used. The flow then proceeds to 485 to test whether the current limit is less than or equal to a predetermined minimum threshold. If YES, then the flow proceeds to the 480 failure mode. If NO, then the flow proceeds to 490 to wait for effects. The flow then proceeds to 475 where another determination is made whether the threshold is met. If met or okay, then the flow proceeds to success block 495, and thus to 420.

If not met or failed, the flow proceeds to 470 to again decrement the limit. (In a third possibility, if a short term state is equal to a particular value, such as seven (7), then the flow proceeds to the 480 to again reset the limit to the maximum value.) After decrementing the value at 470, a decision 485 determines whether the current limit is at or below a predetermined minimum value. If not, then wait at 490 to see the effects of the change, and then repeat the threshold test at 475. If the current limit is at or below the predetermined minimum value, the process continues to 480 to reset to (or close to) the maximum value, and then flow returns to 450 on the left side of the figure.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for packet data communications comprising the steps of:
   accessing a tunnel connection over a communication circuit, the communication circuit providing packet data communications over a network between first and second nodes;
   transmitting and receiving monitoring packets between the first and second nodes in both directions, the monitoring packets traveling over the tunnel connection;
   based on the monitoring packets, calculating performance metrics for the tunnel connection, separately for each direction and storing values of at least one of the performance metrics for the circuit, wherein the performance metrics comprise at least one metric selected from a set of metrics that includes packet loss, jitter, and latency;
   after receipt of a data packet from a remote peer on the circuit:
   comparing the stored values of at least one performance metric for the circuit against corresponding severity breakpoints, and based on the comparison, assigning a current alarm value for each of the at least one performance metrics for the circuit;
   responsive to the current alarm value assigned to one of the performance metrics exceeding a corresponding alarm limit, decreasing a QOS policy packet data throughput rate limit for the circuit to a predetermined minimum value thereby limiting throughput of packet data traffic on the circuit to the predetermined minimum value;
   waiting for an evaluation period;
   upon conclusion of the evaluation period, checking whether the assigned current alarm value has receded below the corresponding alarm limit, indicating that the alarm condition was due to circuit saturation;
   based on the assigned current alarm value having receded below the corresponding alarm limit, establishing a maximum new QOS policy packet data throughput rate at which the assigned current alarm value no longer exceeds the corresponding alarm limit; and
   updating the QOS policy packet data throughput rate limit to the maximum new QOS policy rate thereby permitting throughput of packet data traffic on the circuit up to the maximum new QOS policy rate.

2. The method of claim 1 including:
   based on the contents of a received monitoring packet, determining a latency of the circuit in one direction by evaluating a difference between a latency floor value and a timestamp in the received monitoring packet; and
   updating the latency floor value based on the received packet timestamp.

3. The method of claim 1 wherein the QOS policy rate limit minimum value is in a range of 50%-75% of the corresponding circuit's rated speed, and the evaluation period is on the order of a few seconds.

4. The method of claim 1 wherein establishing the maximum new rate comprises:
   first increasing the rate to a predetermined percentage of the circuit's rated speed;
   determine whether the current alarm value remains below the corresponding alarm limit; and
   if the current alarm value again exceeds the corresponding alarm limit, incrementally decreasing the rate and re-checking the performance metrics after each decrease until the current alarm value no longer exceeds the corresponding alarm limit.

5. The method of claim 1 and further comprising:
   storing severity breakpoints for generating alarm values from latency, loss, and jitter statistics, including both long-term breakpoints and short-term breakpoints;
   calculating short-term performance metrics for the communication circuit, the short-term performance metrics including packet loss, jitter, and latency;
   calculating long-term performance metrics for the communication circuit, the long-term performance metrics including packet loss, jitter, and latency;
   assigning alarm values to each of the short-term and long-term performance metrics based on comparing the performance metrics to the corresponding short-term breakpoints and long-term breakpoints;
   selecting one of the short-term performance metrics and the long-term performance metrics based on comparing a sum of the short-term assigned alarm values to a sum of the long term assigned alarm values; and
   utilizing the selected one of the short-term performance metrics and the long-term performance metrics for selecting alarm limits.

6. The method of claim 1 and further comprising:
   provisioning a CPE router coupled to the circuit at the first node and provisioning an endpoint server coupled to the network at the second node, the CPE router and the endpoint server defining remote peers; and configuring the CPE router and the endpoint server to transmit and receive the monitoring packets over the tunnel connection.

7. The method of claim 6 wherein the circuit coupling the CPE router and the endpoint server is an internet service provider (ISP) internet connection.

8. The method of claim 6 including:

storing local data at the CPE router comprising jitter performance statistics, based on a system of average buckets, where each bucket corresponds to a jitter alarm level, and bucket counters are incremented based on the jitter of packets as they are received.

9. The method of claim 8 and further comprising:

storing local data at the endpoint server comprising jitter performance statistics, based on a system of average buckets, where each bucket corresponds to a jitter alarm level, and bucket counters are incremented based on the jitter of packets as they are received.

10. A method comprising:

accessing a tunnel connection over a communication circuit, the communication circuit providing packet data communications over a network between first and second nodes and having a maximum rated speed;

transmitting and receiving monitoring packets between the first and second nodes in both directions, the monitoring packets traveling over the tunnel connection;

based on the monitoring packets, calculating performance metrics for the tunnel connection, separately for each direction, and storing values of at least one of the performance metrics wherein the performance metrics comprise packet loss, jitter, and latency;

comparing the stored values of the performance metrics against predetermined alarm threshold values, responsive to at least one of the stored values exceeding a corresponding alarm threshold value, decreasing a per packet QOS policy rate limit to a predetermined minimum value;

updating the performance metrics based on transmitting and receiving subsequent monitoring packets;

determining whether performance has improved based on the updated performance metrics;

if performance improved, iterating over a series of rates, starting with a rate approximately equal to the maximum rated speed of the circuit, incrementally decreasing the rate below the maximum, and re-checking the performance metrics at each iteration so as to find an optimum rate that is a highest rate that does not cause degradation of the performance metrics beyond the predetermined alarm threshold values; and updating the QOS policy rate limit to the optimum rate.

11. The method of claim 10 and further comprising:

calculating short-term performance metrics for the communication circuit, the short-term performance metrics including packet loss, jitter, and latency;

calculating long-term performance metrics for the communication circuit, the long-term performance metrics including packet loss, jitter, and latency; and selecting one of the short-term performance metrics and the long-term performance metrics as the stored performance metrics to use for the comparison against predetermined alarm threshold values.

12. The method of claim 10 wherein the predetermined minimum value of the per packet QOS policy rate limit is a selectable percentage of the circuit's rated speed.

13. The method of claim 10 wherein one or more of the performance metrics is determined by averaging the metric values calculated from the monitoring packets over a selected time period.

14. The method of claim 10 wherein one or more of the performance metrics is determined by calculating a moving average of the metric values calculated from the monitoring packets.

15. The method of claim 10 wherein a series of alarm levels are selected for each of the performance metrics, wherein each alarm level corresponds to a respective breakpoint of a range of values for the corresponding performance metric.

16. The method of claim 6 including:

creating a modified-moving-average latency floor variable at one or more of the endpoint nodes to be used when comparing received packet timestamps from the remote host;

determining one-way circuit latency based on a value of the modified-moving-average latency floor variable.

17. The method of claim 10 wherein the predetermined minimum value of the per packet QOS policy rate limit is 70% of the initial setting.

18. The method of claim 10 wherein a monitoring packet includes:

i) a sending timestamp, ii) an instance number, iii) an incrementing packet index, iv) most recent calculated short-term statistics (latency, loss, jitter), and/or v) most recent calculated long-term statistics (latency, loss, jitter).

* * * * *